United States Patent [19]

Flygare et al.

[11] Patent Number: 4,647,805
[45] Date of Patent: Mar. 3, 1987

[54] DYNAMOELECTRIC MACHINE

[75] Inventors: Wayne A. Flygare, Rockford; Vallabh V. Vaghani, Belvidere; John Readman, Rockford, all of Ill.

[73] Assignee: Sundstrand Corporation, Rockford, Ill.

[21] Appl. No.: 809,286

[22] Filed: Dec. 16, 1985

[51] Int. Cl.$^4$ .............................. H02K 1/32
[52] U.S. Cl. ...................... 310/61; 310/53; 310/54; 310/59; 310/65
[58] Field of Search ............ 310/61, 62, 63, 58, 310/59, 53, 54, 64, 65, 90, 112, 68 D, 261, 60 R, 60 A; 417/327; 418/88, 94

[56] References Cited

U.S. PATENT DOCUMENTS

| | | | |
|---|---|---|---|
| 2,894,155 | 7/1959 | Labastie | 310/54 |
| 3,060,335 | 10/1962 | Greenwald | 310/54 |
| 3,260,872 | 7/1966 | Potter | 310/54 |
| 3,261,295 | 7/1966 | White | 310/54 |
| 3,524,090 | 8/1970 | Sark | 310/61 |
| 3,543,062 | 11/1970 | Banchieri | 310/54 |
| 3,686,522 | 8/1972 | Konovalov et al. | 310/54 |
| 4,341,093 | 7/1982 | Oishi et al. | 310/54 |
| 4,364,241 | 12/1982 | Okamoto et al. | 310/54 |
| 4,470,772 | 9/1984 | Gannaway | 417/372 |

Primary Examiner—R. Skudy
Attorney, Agent, or Firm—Wood, Dalton, Phillips, Mason & Rowe

[57] ABSTRACT

Windage losses in a liquid cooled dynamoelectric machine having a stator 10 including an armature 14, a rotor 20 journalled for rotation about an axis within the armature 14, a pump 50, a sump 56 and a liquid flow path 24 within the rotor 20 are avoided through the use of a first transfer tube 58 connecting the pump 50 and one end 68 of the flow path along with a second transfer tube 92 coaxially surrounding the first transfer tube 58 and connected to the other flow path end 91 and to the sump 56.

8 Claims, 1 Drawing Figure

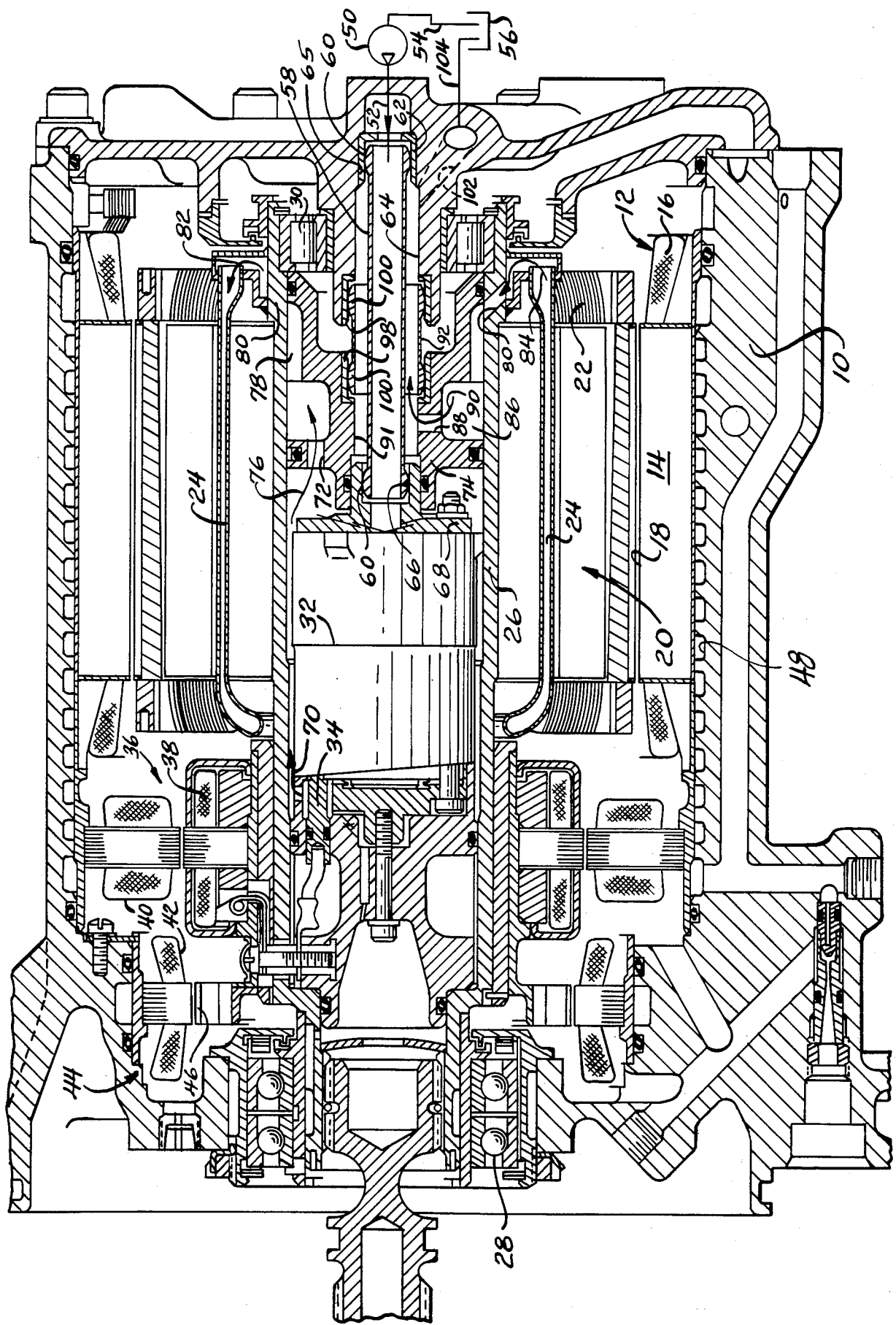

DYNAMOELECTRIC MACHINE

FIELD OF THE INVENTION

This invention relates to dynamoelectric machines, and more particularly, to improved rotor cooling in dynamoelectric machines.

BACKGROUND OF THE INVENTION

It has long been known that the capacity of dynamoelectric machines, whether utilized as generators or as motors, can be considerably increased if the components thereof are cooled. Of various cooling schemes available, liquid cooling is preferred over gas cooling because of the typically greater heat capacity of a given volume of liquid coolant over a gaseous coolant.

Liquid cooling of the machine stator does not provide a particular difficulty since stator components are stationary and it is a relatively simple matter to establish the requisite connections for a liquid flow path throughout the stator sufficient to provide the desired degree of cooling. Conversely, cooling rotor component presents more of a problem in that means for conducting the coolant from a stationary part of the machine to the rotor are required; and this typically requires couplings, unions or any of a variety of other known means.

Such structure increases the complexity of the apparatus and can result in a loss of machine efficiency. In particular, if the liquid coolant is permitted to leak at the transfer point from stationary machine components to rotating machine components, there is a strong possibility, and even a probability that the liquid will be driven to the air gap between the rotor and the stator armature which will result in so-called "windage losses".

Another difficulty that may be encountered in liquid cooled rotors occurs when, for some reason, the coolant supply is temporarily interrupted. Notwithstanding such interruption, heat will continue to be generated within the rotor. Should the build-up become too great over the period of interruption of coolant flow to the rotor, severe damage to the machine will result.

The present invention is directed to overcoming one or more of the above problems.

SUMMARY OF THE INVENTION

It is a principal object of the invention to provide a new and improved dynamoelectric machine with rotor cooling constructed to prevent passage of leaking coolant to the rotor-stator air gap.

It is also a principal object of the invention to provide, in a dynamoelectric machine having liquid rotor cooling, a means for assuring a measure of continued cooling even in the event of an interruption in the coolant supply.

The first facet of the invention is achieved in a dynamoelectric machine having a stator including an armature. A rotor is journalled for rotation about an axis within the armature. The machine includes a pump as well as a sump and means are provided to define a liquid flow path within the rotor. The flow path has coaxial ends located on the rotational axis of the rotor. A first transfer tube is disposed on the axis and is connected to one of the flow path ends as well as to the pump and a second transfer tube is disposed on the axis and coaxially surrounds the first transfer tube. The second transfer tube is connected to the other of the flow path ends and to the sump.

As a consequence of the foregoing construction, coolant under high pressure from the pump is passed to the rotor via the first transfer tube. Such leakage, as may occur as a result of the passage of high pressure liquid, is confined by the second transfer tube which is at low pressure by reason of its being connected to the sump. As a result, leakage to the air gap, at the junction of rotary and stationary components, is cut to an absolute minimum or eliminated altogether.

According to this embodiment, the transfer tubes each have journal formations on each of their ends and are rotatable relative to both the rotor and the stator. During operation of the machine, rotation of the rotor and the presence of the journal formations tend to provide a dynamic seal at each such location to further enhance the ability of the machine to prevent leakage.

According to another facet of the invention, there is a stator, a rotor, a pump and a sump as before. An inlet is provided to a coolant flow path on the rotor, which inlet is located on the rotational axis of the rotor. The inlet is connected to the pump. An outlet from the flow path is also located on the rotor and is hydraulically spaced from the inlet and disposed radially outwardly of the inlet as well as radially inwardly of a part of the flow path located hydraulically between the inlet and the outlet.

As a consequence of this construction, upon an interruption in the flow of coolant to the inlet, the coolant in the flow path radially inwardly of the outlet will continue to flow through centrifugal force to continue cooling rotor components. In most cases, such flow will continue over the length of the interruption of the coolant supply, In the event the coolant supply interruption is even more prolonged, a pool of coolant will exist within the flow path at locations radially outwardly of the outlet which will continue to absorb heat from heat producing components at such locations.

Other objects and advantages will become apparent from the following specification taken in connection with the accompanying drawings.

DESCRIPTION OF THE DRAWINGS

The FIGURE is a sectional view of a dynamoelectric machine in the form of brushless generator made according to the invention.

DESCRIPTION OF THE PREFERRED EMBODIMENT

An exemplary embodiment of a dynamoelectric machine made according to the invention is illustrated in the drawing in the form of a so-called brushless generator. However, it is to be understood that the invention is not limited to brushless generators or even to generators, but may find applicability in dynamoelectric machines employed as motors.

The machine includes a housing 10 disposed about a stator, generally designated 12. The stator 12 includes an armature 14 as well as windings, the end turns 16 of which may be seen. The stator 14 includes a cylindrical inner opening 18 for receipt of a rotor, generally designated 20. As illustrated in the FIGURE, the rotor 20 is a multiple pole rotor having main field windings 22 with coolant passages 24 in heat exchange relation therewith. The specific type of coolant passages 24 and their interrelationship with the windings 22 may be ascertained in greater detail by reference to the commonly assigned application of Vaghani et al, Ser. No. 755,255, filed July 15, 1985 and entitled "Generator Rotor Cooling", now U.S. Pat. No. 4,603,272, the details of which are herein incorporated by reference.

The rotor components thus far described are disposed upon a hollow shaft 26 which is journalled within the opening 18 by means of bearings 28 at the input end of the shaft 26 and by bearings 30 oppositely thereof.

As is well known, in brushless generators, the windings 22 constitute the main field winding for the generator to induce current within the stator 12. To provide excitation for the windings 22, alternating current, normally three-phase, is rectified by a full wave rectifier (not shown) received within a rectifier housing 32 disposed within the hollow of the shaft 26. Terminals such as shown at 34 provide a three-phase alternating current input to the rectifier from an exciter, generally designated 36, having an armature 38 located on the shaft 26. A magnetic field for the exciter 36 is provided by current directed through exciter stator windings 40, after rectification, from field windings 42 of a permanent magnet generator, generally designated 44 including permanent magnets 46 carried by the shaft 26.

A spiralled conduit 48 within the housing 10 may provide so-called "back iron" cooling for various stator components, and forms no part of the present invention. To provide for cooling of the rotor and associated components, a pump 50 has an output 52 connected to the rotor 20 and an inlet 54 connected to a sump shown schematically at 56.

The pump 50 provides a coolant under pressure, usually oil to also act as a lubricant, to a first transfer tube 58 disposed on the rotational axis of the rotor 20. The transfer tube 58 has journal-like formations 60 on its opposite ends, which formations are generally spherical. As viewed in the drawing, the right-hand end of the transfer tube 58 is rotatably received in a sleeve 62 defining a first port within the housing 10. It will be seen that the sleeve 62 is disposed within a bore 64 in the housing 10 located on the axis of rotation of the rotor 20 and specifically, in a reduced diameter portion 65 of such bore 64.

The left-hand end of the transfer tube 58 is received in a recess 66 in a cap 68 forming part of the rectifier housing 32. Thus, the coolant may be flowed from the pump 50 through the transfer tube 58 at high pressure to the interior of the rectifier housing 32 to cool rectifier components contained therein.

At the opposite side of the housing 32, a port allows the coolant to exit the housing 32 and pass between the boundary of the housing 32 and the interior of the rotor shaft 26 as illustrated by an arrow 70. The coolant thus tends to cool the exterior of the rectifier housing 32 as well as to absorb any heat conducted to the shaft 26. The coolant flow path includes passages 72 through a distributor 74 within the shaft 26, as shown by an arrow 76, to allow communication to an axial groove 78 and diagonal bores 80 to the coolant passages 24, as shown by an arrow 82. As can be ascertained from the previously identified Vaghani application, the passages 24 are generally U-shaped and thus, fluid may emerge from each of the passage 24 as illustrated by an arrow 84 to move radially inwardly through a diagonal bore 80 ultimately to pockets 86 (only one of which is shown) in the distributor 74 and then radially inwardly through bores 88 to the exterior of the transfer tube 58. This flow is shown by an arrow 90 and brings the coolant to the interior of a bore 91 in the distributor 74 and aligned with the bore 64 in the housing 10. A second transfer tube 92 is located on the axis of rotation of the rotor 20 in coaxial relation and surrounding relation to the transfer tube 58. Both the distributor 74 and the housing 10 include sleeves 98 similar to the sleeve 62, but somewhat larger, to receive journal formations 100 on respective end of the second transfer tube 92. The journal formations 100 may be identical to journal formations 60 on the first transfer tube 58 and allow the transfer tube 92 to rotate with respect to both of the sleeves 98.

The bore 64 in the housing 10 opens via a bore 102 to line 104 extending to the sump 56. As a consequence of this construction, it will be appreciated that coolant in the annulus between the first and second transfer tubes 58 and 92 will be a very low pressure, substantially equal to the pressure at the sump 58.

In operation, a prime mover is coupled to the shaft 26 to rotate the rotor 20 and some suitable source of power for driving the pump 50 is provided. Coolant under high pressure will enter the rotor flow path via the first transfer tube 58. Because of the presence of the journal formations 60 and relative rotation occurring between the various components, a dynamic seal will be formed at such locations that will tend to prevent even the high pressure coolant from leaking. However, to the extent that it does leak, it leaks into a low pressure area defined by the bore 64 and the second transfer tube 92. The latter also has the benefit of dynamic sealing provided by the journal formations 100 and because of the low pressure in this area, there will be very little, if any, tendency for the coolant to leak radially outwardly of the second transfer tube 92 to travel along the sides of the rotor to the air gap at the opening 18. As a consequence, windage losses are avoided in the inventive structure.

It will also be appreciated that in the case of a temporary interruption in the operation of the pump 50 to supply coolant to the machine, coolant flow will nonetheless occur. In particular, because the connection to the sump 56 is via the second transfer tube 92 which, in turn, is located radially outwardly of the inlet defined by the transfer tube 58, continued rotation of the rotor 20 will assure that centrifugal force is applied to the coolant contained within the rotor. Coolant radially inwardly of the outlet will, under the influence of such centrifugal force, drive coolant radially outwardly of the outlet through the flow path and through the second transfer tube 92 until no further coolant remains radially inwardly of the second transfer tube 92. In the usual case, by the time such occurs, flow from the pump 50 will be restored. However, during the interruption, it will be appreciated that coolant will have continued to flow to provide cooling.

In the event flow from the pump 50 has not been reestablished, annular pools of coolant will still remain at location radially outwardly of the second transfer tube 92 and will continue to absorb heat as their temperature increases.

We claim:
1. A dynamoelectric machine comprising:
a stator including an armature;
a rotor journalled for rotation about an axis within said armature;
a pump;
a sump;
means defining a liquid flow path within said rotor, said flow path having coaxial ends located on said axis;

a first transfer tube on said axis connected to one of said ends and to said pump; and a second transfer tube on said axis and coaxially surrounding said first transfer tube, said second transfer tube being connected to the other of said ends and to said sump.

2. The dynamoelectric machine of claim 1 wherein said transfer tubes each have journal formations on each of their ends and are rotatable relative to said rotor and said stator.

3. The dynamoelectric machine of claim 1 wherein said flow path has segments radially outwardly of said second transfer tube in heat exchange relation to rotor components to be cooled.

4. The dynamoelectric machine of claim 1 wherein said machine includes a housing at least partially surrounding said rotor and said stator; said housing having first and second coaxial ports located on said axis and facing said ends, said first and second transfer tubes respectively extending between said first and second coaxial ports and an associated end of said flow path.

5. A dynamoelectric machine comprising;

a stator;

a rotor journalled with said stator for rotation about an axis and having a coolant flow path;

a pump;

a sump;

an inlet to said coolant flow path on said axis and connected to said pump; and an outlet from said flow path on said rotor and hydraulically spaced from said inlet and disposed radially outwardly of said inlet and radially inwardly of a part of said flow path located hydraulically between said inlet and said outlet.

6. The dynamoelectric machine of claim 5 wherein said inlet and said outlet are coaxial with said outlet being annular about said inlet.

7. The dynamoelectric machine of claim 6 further including coaxial, rotatable transfer tubes interconnecting respective ones of said inlet, outlet, pump and sump.

8. A dynamoelectric machine comprising;

a housing;

a stator within said housing and having an armature with a rotor receiving space;

a rotor within said space;

bearings in said housing journalling said rotor for rotation about an axis in said space;

a coolant flow path within said rotor and having opposed ends, said ends being located on said axis in coaxial relation with one end being radially outward of the other said end and axially spaced therefrom, said flow path, between said ends, having at least one portion radially outward of said one end;

coaxial first and second ports in said housing opening toward said ends and aligned therewith on said axis, said second port being radially outward of said first port and axially spaced therefrom;

a first transfer tube having journal ends rotatably received and extending between said other end and said first port;

a second transfer tube having journal ends rotatably received and extending between said one end and said second port;

a pump connected to said first port; and a sump connected to said second port.

* * * * *